F. D. CLEVELAND.
MACHINE FOR HANDLING AND CUTTING FISH.
APPLICATION FILED APR. 16, 1913.

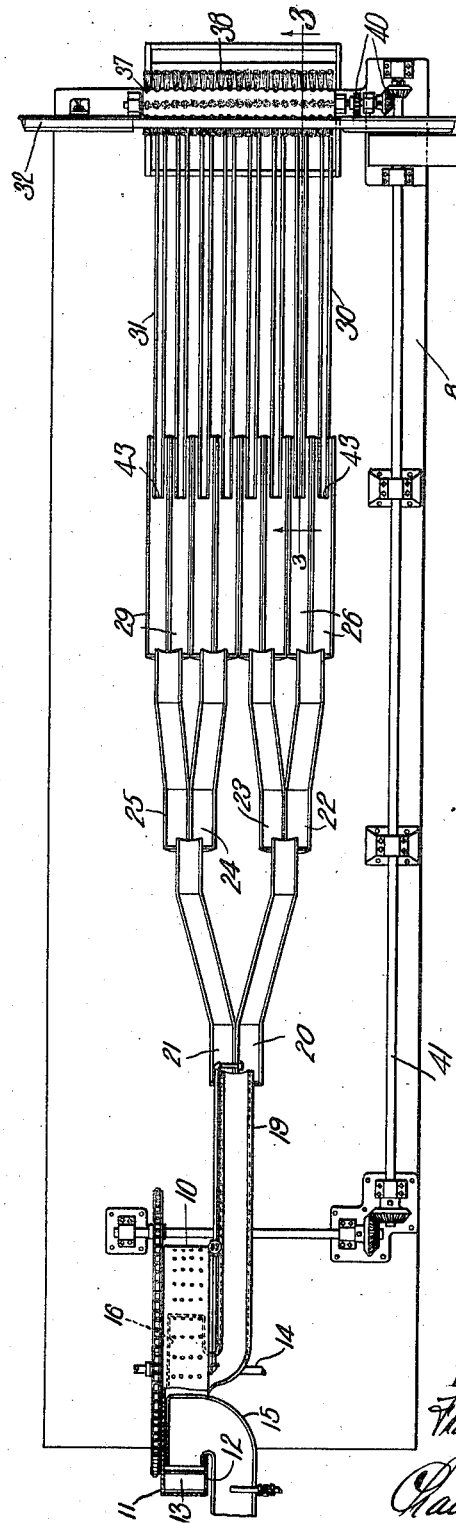

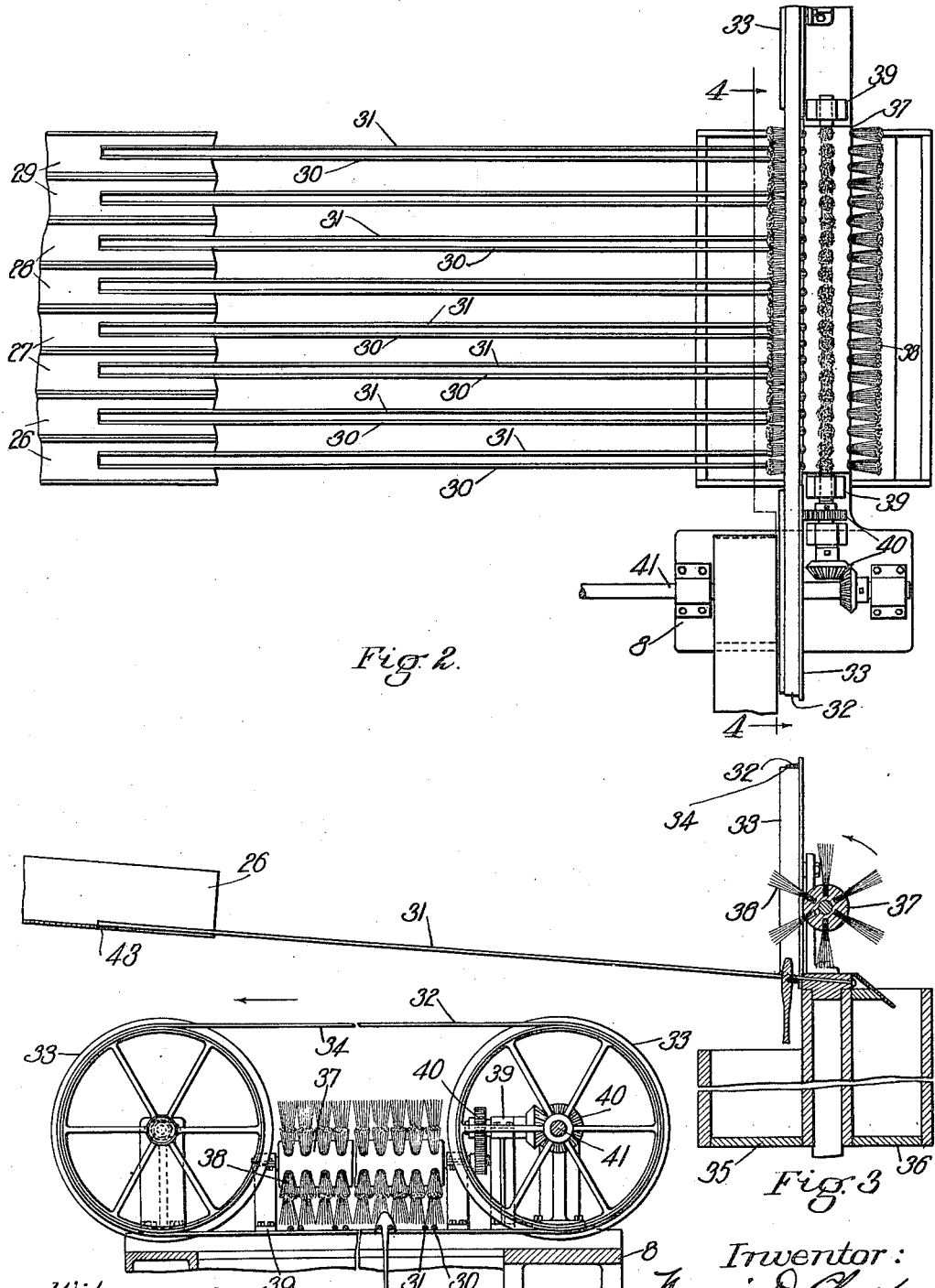

1,078,718. Patented Nov. 18, 1913.
3 SHEETS—SHEET 3.

UNITED STATES PATENT OFFICE.

FRANCIS D. CLEVELAND, OF WINCHESTER, MASSACHUSETTS, ASSIGNOR TO WILLIAM UNDERWOOD COMPANY, OF BOSTON, MASSACHUSETTS, A CORPORATION OF MASSACHUSETTS.

MACHINE FOR HANDLING AND CUTTING FISH.

1,078,718.   Specification of Letters Patent.   Patented Nov. 18, 1913.

Application filed April 16, 1913.  Serial No. 761,425.

*To all whom it may concern:*

Be it known that I, FRANCIS D. CLEVELAND, a citizen of the United States, residing at Winchester, in the county of Middlesex and State of Massachusetts, have invented new and useful Improvements in Machines for Handling and Cutting Fish, of which the following is a specification.

This invention relates to improvements in machines for handling and cutting fish.

The object of the invention is to provide a simple, inexpensive machine adapted to subdivide a mass of fish into fractional portions thereof, to segregate the fish constituting said fractional portions and to deliver said fish end foremost to means adapted to turn said fish head uppermost and to engage said fish beneath the gills, to suspend and guide the same by their gills to cutting instrumentalities which sever the heads from the bodies thereof and deposit the bodies in one receptacle and the heads in another receptacle, the operation of said various instrumentalities being entirely automatic from the dumping of the fish in a mass into the subdividing mechanism until they are delivered, the bodies in one receptacle and the heads in another.

The invention consists in the combination and arrangement of parts whereby the above objects and certain other objects hereinafter appearing are attained, as set forth in the following specification and particularly pointed out in the claims.

Figure 5:
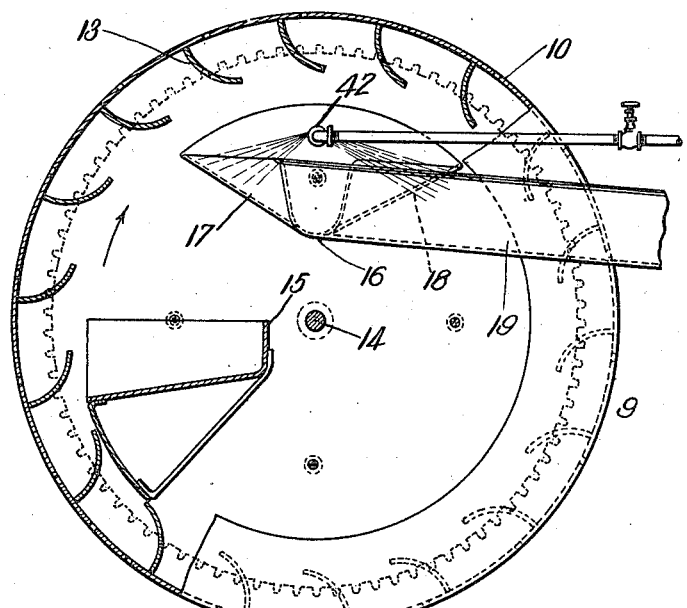
Figure 6:
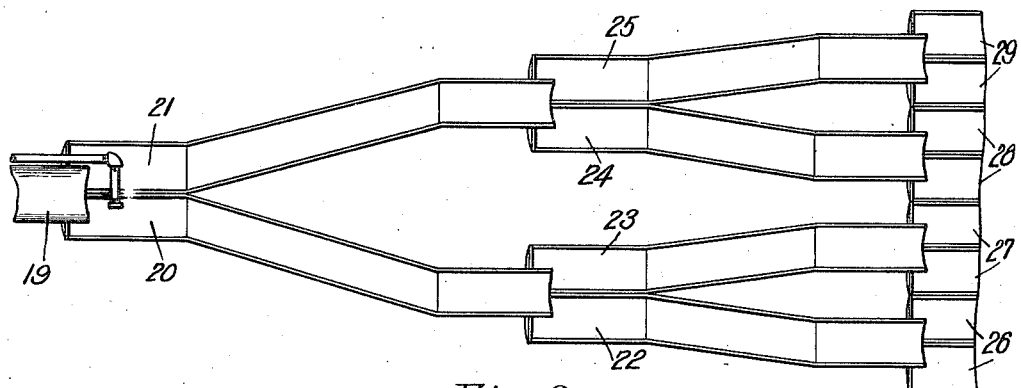

Referring to the drawings: Figure 1 is a plan view of a machine embodying my invention. Fig. 2 is a detail plan view of that portion of the machine which is adapted to turn the fish on end, suspend and guide the same by their gills, together with means for severing the heads from the bodies of said fish, parts of said severing mechanism being broken away to save space. Fig. 3 is a section, partly in elevation, taken on line 3, 3 of Fig. 1 as viewed in the direction of the arrows on said line. Fig. 4 is a transverse section taken on line 4, 4 of Fig. 2, with parts broken away to save space in the drawings. Fig. 5 is a detail side elevation of the means for subdividing a mass of fish into fractional portions thereof. Fig. 6 is a detail plan view of the means for segregating the fish and delivering the same end foremost.

Like numerals refer to like parts throughout the several views of the drawings.

In the drawings, 8 is the frame of the machine upon which are preferably mounted the various instrumentalities consisting of a hollow rotary drum 9 having an outer rim 10 and flanges 11 and 12 projecting inwardly therefrom. To the interior of the outer rim 10 between the flanges 11 and 12 are secured a series of buckets 13 adapted to contain fish, said buckets being preferably concavo-convex, the concave sides being on the inner side of the buckets or on that side of said buckets against which the fish are deposited.

The drum 9 is rotatably mounted upon a shaft 14 journaled to rotate in suitable bearings in the frame 8, a rotary motion being imparted to said shaft by any suitable means not shown in the drawings. A chute 15 is provided into which fish are deposited in masses and directed thereby through the opening at one side of said drum to the buckets 13. As the drum 9 is rotated in the direction of the arrow, Fig. 5, fish from the chute 15 are carried by the buckets 13 upwardly and dumped into a chute 16 which is arranged above the chute 15.

The portion of the chute 16 within the drum 9 is a large hopper-like structure provided with flaring sides 17 and 18, thus as the fish are emptied into said chute they will be conducted to the bottom and to one side of said chute which is provided with an opening to which another chute 19 is connected, said chute 19 being U-shaped and inclined downwardly. Supported beneath the outer end of the chute 19 and also at an incline is a pair of U-shaped chutes 20 and 21, the upper ends thereof being adjacent to the outer end of the chute 19 and directly beneath said chute. These chutes are so arranged that the mass of fish which is being conducted along the chute 19 will be subdivided thereby, portions of which will be deposited in the upper end of the chute 20, while other portions will be deposited into the chute 21.

The chutes 20 and 21 preferably slightly diverge downwardly, the chute 20 being connected at its lower end to a pair of chutes 22 and 23, while the chute 21 is connected at its lower end with chutes 24 and 25, thus the fish or masses of fish being conducted through the chutes 20 and 21 will be still further subdivided or segregated by the chutes 22, 23, 24 and 25. Likewise the chutes 22 and 23 slightly diverge downwardly as do the chutes 24 and 25, each of said chutes being connected at their lower ends by a pair of chutes 26, 27, 28 and 29 respectively. Into these last named chutes the fish from the rotary drum 9 are finally delivered lengthwise or with their ends foremost and along which they are guided substantially horizontally until they project into the lower ends of said chutes at which points said chutes are provided with slots 43. Preferably connecting the lower ends of said chutes 26, 27, 28 and 29 are means adapted to suspend and guide fish by their gills, said means comprising parallelly arranged members preferably consisting of rods 30 and 31 which incline downwardly from the inner ends of said slots 43 and as the fish are delivered from said chutes, end foremost, one at a time between said rods which are placed just far enough apart to permit the bodies of said fish to pass downwardly therebetween, but near enough to engage the gills of said fish, said fish will be caught and suspended therefrom, by their gills.

The incline of the rods 30 and 31 is sufficient to cause the fish deposited therein to slide toward the lower ends thereof and adjacent to said lower ends is provided an endless cutter 32, preferably of the band knife construction which is arranged to revolve about pulleys 33 journaled to rotate at opposite sides of the series of guides 30 and 31 with said cutter arranged to move transversely in contact with preferably the lower edges of the rods 30 and 31, thus as said fish are guided downwardly between said guiding members they will be forced against the rapidly moving cutting edge 34 of said cutter and the heads thereof will consequently be severed from the bodies permitting the bodies to drop into receptacles 35 placed directly therebeneath from which they may be removed at will. The heads of the fish are carried across said cutter and deposited in another receptacle 36. To facilitate the severing of the heads from the bodies of said fish and to subsequently insure the removal of said heads from said cutter, I have preferably provided a rotary brush 37 comprising a series of rows of bristles 38 placed at substantial distances apart about the periphery of the body of said brush. The brush 37 is mounted to rotate in bearings 39 on the frame of the machine and may be driven by any suitable means, preferably gearing 40, which in turn may be rotated by the shaft 41 upon which one of the pulleys 33 is mounted, said shaft being connected by any suitable means to the driving shaft of the machine not shown in the drawings.

The general operation of the machine hereinbefore described is as follows: The fish are dumped into the chute 15 and floated along said chute into the buckets 13, thus subdividing the mass into fractional portions. The buckets 13 are then revolved in the direction of the arrow, Fig. 5, until said buckets have reached an angle sufficient to cause the fish supported thereby to slide off into the chutes 16 from which they are discharged by jets of fluid from the nozzle 42, thus causing said fish in reduced numbers to slide down the chute 19 into the chutes 20 and 21 in still further reduced numbers, thence onwardly down said chutes into the chutes 22, 23, 24 and 25 and so on down the series of chutes illustrated in Fig. 6 to the delivery ends of the chutes 26, 27, 28 and 29 from which they are delivered, preferably one at a time, end foremost between the rods 30 and 31. As soon as the fish have been deposited on said rods the weight of the bodies thereof causes the same to drop between said rods and as the gills of said fish project laterally from their bodies, said gills will catch upon the rods 30 and 31 thus preventing the fish from falling entirely through the opening between said rods, but suspending said fish by their gills thereupon, while the sides of said chutes 26, 27, 28 and 29, which extend beyond the upper ends of said rods, prevent the fish as they are guided or directed along the tops of said rods from slipping over one side or the other instead of dropping between the same. These rods, as hereinbefore stated, are inclined and the fish hanging thereto are guided downwardly thereby against the cutter 32 which is moving continuously transversely of the guides 30 and 31 in contact with the upper edges thereof and as said fish are driven thereagainst, either by jets of fluid such as water or air or by the pressure of the column of fish thereafter, the heads of said fish will be severed from their bodies and the bodies deposited in the receptacle 35, while the heads thereof will be carried over said cutter by the brush 37 rotating in conjunction therewith, thus depositing said heads in the receptacle 36.

As hereinbefore stated, the continuously moving cutter 32 is arranged to operate against the under edges of said guides 30 and 31. This arrangement however may be somewhat modified, if desired, with said cutter engaging the upper edges of said guides and without departing from the spirit and scope of the invention.

Having thus described my invention, what I claim and desire by Letters Patent to secure is:

1. A machine of the class described having, in combination, means adapted to guide fish suspended by their gills, said means including a pair of parallelly arranged members, and means for severing the heads from the bodies while said fish are in said suspended position.

2. A machine of the class described having, in combination, means adapted to guide fish suspended by their gills, said means including a pair of inclined parallelly arranged members, and means for severing the heads from the bodies of said fish during their passage along said guiding members.

3. A machine of the class described having, in combination, a pair of parallelly arranged members adapted to guide fish suspended by their gills, and a cutter adapted to move transversely of the upper edges of said members to sever the heads of said fish from their bodies during their passage along said members.

4. A machine of the class described having, in combination, means adapted to guide fish suspended by their gills, said means including a pair of parallelly arranged members, instrumentalities for subdividing a mass of fish into fractional portions thereof and delivering said fish end on between said parallelly arranged members, and a cutter arranged to move transversely of said members adapted to sever the heads from the bodies of said fish during their passage along said members.

5. A machine of the class described having, in combination, means adapted to guide fish suspended by their gills, said means including a pair of inclined parallelly arranged members, and a cutter arranged to move transversely of said members adapted to sever the heads from the bodies of said fish during their passage along said members.

6. A machine of the class described having, in combination, means adapted to guide fish suspended by their gills, said means including a pair of inclined parallelly arranged members, a cutter arranged to move transversely of said members adapted to sever the heads from the bodies of said fish during their passage along said members, and receptacles to receive said bodies and heads respectively subsequently to the severing thereof.

7. A machine of the class described having, in combination, means adapted to guide fish suspended by their gills, said means including a pair of inclined parallelly arranged members, a cutter arranged to move transversely of said members adapted to sever the heads from the bodies of said fish during their passage along said members, receptacles to receive said bodies and heads respectively subsequently to the severing thereof, and means adapted to remove the severed heads.

8. A machine of the class described having, in combination, instrumentalities adapted to segregate fish from a mass and deliver said fish end foremost, means including a pair of parallelly arranged members adapted to receive said fish end foremost from said segregating means and to suspend and guide said fish by their gills, and an endless cutter arranged transversely of said guiding means adapted to sever the heads from the bodies of said fish during their passage along said guiding means.

9. A machine of the class described having, in combination, a rotary drum comprising buckets arranged along the periphery thereof, a chute adapted to direct a mass of fish to said drum, a series of chutes adapted to receive fish from said drum to segregate and deliver the same end foremost, and a pair of parallelly arranged members connected with each of the chutes constituting said series of chutes, said parallelly arranged members adapted to receive the fish from their respective chutes to suspend and guide said fish by their gills.

10. A machine of the class described embodying in its construction a chute adapted to guide fish end foremost, and a pair of inclined parallel rods connected with the delivery end of said chute adapted to turn said fish heads up and to suspend the same by their gills.

11. A machine of the class described embodying in its construction means adapted to suspend and guide fish by their gills, including a pair of substantially parallel members.

12. A machine of the class described having, in combination, instrumentalities adapt to segregate fish from a mass and deliver said fish end foremost, a pair of inclined parallel rods adapted to receive fish from said instrumentalities head foremost to suspend and guide said fish by their gills, and a continuously moving cutter arranged to move transversely against the under faces of said rods to sever the heads from the bodies of the fish during their passage along said rods.

13. A machine of the class described having, in combination instrumentalities adapted to segregate fish from a mass and deliver said fish end foremost, a pair of inclined parallel rods adapted to receive fish from said instrumentalities head foremost to suspend and guide said fish by their gills, a continuously moving cutter arranged to move transversely against the under faces of said rods to sever the heads from the bodies of the fish during their passage along said rods, a chute arranged beneath said rods adjacent to the cutting edge of said cutter adapted to receive the bodies of said fish, and means to remove the heads of said fish from said cutter.

In testimony whereof I have hereunto set my hand in presence of two subscribing witnesses.

FRANCIS D. CLEVELAND.

Witnesses:
CHARLES S. GOODING,
SYDNEY E. TAFT.